United States Patent
Matsuno (10) Patent No.: US 9,754,510 B1
(45) Date of Patent: Sep. 5, 2017

(54) VISION-ASSIST DEVICES FOR PROVIDING INFORMATION TO A USER THROUGH THERMAL FEEDBACK AND METHODS

(71) Applicant: Toyota Motor Engineering & Manufacturing North America, Inc., Erlanger, KY (US)

(72) Inventor: Nobuyuki Matsuno, San Jose, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/059,880

(22) Filed: Mar. 3, 2016

(51) Int. Cl.
G09B 21/00 (2006.01)

(52) U.S. Cl.
CPC .................. *G09B 21/007* (2013.01)

(58) Field of Classification Search
None
See application file for complete search history.

(56) References Cited

U.S. PATENT DOCUMENTS

| | | | |
|---|---|---|---|
| 9,092,060 B1 * | 7/2015 | Joshi | G06F 3/016 |
| D768,024 S * | 10/2016 | Dayal | D10/65 |
| 2008/0027510 A1 * | 1/2008 | McClure | A61N 1/36046 |
| | | | 607/54 |
| 2012/0075072 A1 | 3/2012 | Pappu | |
| 2014/0184384 A1 | 7/2014 | Zhu et al. | |
| 2016/0127698 A1 * | 5/2016 | Mali | H04N 7/185 |
| | | | 348/62 |

FOREIGN PATENT DOCUMENTS

| | | |
|---|---|---|
| CN | 204181857 U | 3/2015 |
| WO | 2013173898 A2 | 11/2013 |

OTHER PUBLICATIONS

Gelmuda et al., "Electronic Aids for Blind People—Overview." Published: May 10, 2012. https://www.google.co.in/url?sa=t&rct=j&q=&esrc=s&source=web&cd=3&ved=0ahUKEwiByPqJwY_KAhWVBI4KHZEtBakQFggtMAI&url=http%3A%2F%2Feiapgos.pl%2Ffulltxt.php%3FICID%3D1080746&usg=AFQjCNF2WW58WrkxOX9CugjERFvMhyVQg&sig2=pVs3oieN1UUiUuF5eDQcZg&bvm=bv.110151844,d.c2E&cad=rja.

* cited by examiner

*Primary Examiner* — K Wong
(74) *Attorney, Agent, or Firm* — Dinsmore & Shohl LLP (57) ABSTRACT

Embodiments of the present disclosure are directed to vision-assist devices and methods. In one embodiment, a vision-assist device includes one or more processors, one or more memory modules communicatively coupled to the one or more processors, and one or more sensing devices communicatively coupled to the one or more processors and operable to sense an environment. Machine readable instructions stored in the one or more memory modules cause the one or more processors to: receive environmental information from the one or more sensing devices; and generate a thermal feedback signal regarding a subset of the environmental information acquired by the one or more sensing devices. One or more heating elements are communicatively coupled to the one or more processors and produce thermal feedback in response to receipt of the thermal feedback signal. The thermal feedback is indicative of the subset of environmental information.

20 Claims, 7 Drawing Sheets

VISION-ASSIST DEVICES FOR PROVIDING INFORMATION TO A USER THROUGH THERMAL FEEDBACK AND METHODS

TECHNICAL FIELD

The present specification generally relates to vision-assist devices, and more particularly, to vision-assist devices that provide thermal feedback regarding environmental and other types of information.

BACKGROUND

Blind or visually impaired persons have difficulty navigating within new or unfamiliar environments because of their inability to visually detect particular locations and objects within the environment. Blind or visually impaired persons will often use a cane to assist them in navigating a space. In recent advancements, devices have been created that communicate information to a blind person as to characteristics of the environment through auditory or vibratory feedback. However, such devices are limited because in crowded or loud spaces a user may not be able to hear auditory cues from the device or may not be sensitive to vibratory feedback. Therefore, devices using auditory or vibratory feedback may not adequately make available information necessary to a blind person.

Accordingly, a need exists for alternative vision-assist devices for blind or visually impaired persons that provide additional dimensions of communication.

SUMMARY

In one embodiment, a vision-assist device for providing environmental information to a user may include one or more processors. One or more memory modules are communicatively coupled to the one or more processors. One or more sensing devices are communicatively coupled to the one or more processors and operable to sense an environment. Machine readable instructions are stored in the one or more memory modules that, when executed by the one or more processors, cause the one or more processors to: receive environmental information from the one or more sensing devices and generate a thermal feedback signal regarding a subset of the environmental information acquired by the one or more sensing devices. The vision-assist device further includes one or more heating elements communicatively coupled to the one or more processors for producing thermal feedback in response to receipt of the thermal feedback signal, wherein the thermal feedback is indicative of the subset of environmental information.

In another embodiment, a vision-assist device for providing non-visual commands may include one or more processors. One or more memory modules are communicatively coupled to the one or more processors. One or more cameras are communicatively coupled to the one or more processors to generate image data corresponding to an environment. Machine readable instructions stored in the one or more memory modules that, when executed by the one or more processors, cause the one or more processors to: receive environmental information from the one or more cameras and generate a thermal feedback signal regarding a subset of the environmental information acquired by the one or more cameras. One or more heating elements are also communicatively coupled to the one or more processors for producing thermal feedback in response to receipt of the thermal feedback signal, wherein the thermal feedback is indicative of at least one of instructions for communicating with the vision-assist device and a direction of a point of interest.

In yet another embodiment, a method for providing thermal feedback to indicate information regarding a point of interest may include sensing an environment with one or more sensors; receiving environmental information from the one or more sensors; determining a location of a point of interest within the environment; and generating thermal feedback regarding the location of the point of interest.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following description of the illustrative embodiments can be understood when read in conjunction with the following drawings, where like structure is indicated with like reference numerals and in which:

DETAILED DESCRIPTION

Referring generally to the figures, embodiments of the present disclosure are directed to vision-assist devices for assisting blind or visually impaired individuals to navigate their environment. Generally, embodiments described herein may be configured as devices that capture data pertaining to information about a user's environment using one or more sensors (e.g., one or more cameras and or proximity sensors) and communicate a subset of that information to the user. Such information may be useful to the blind or visually impaired individual as he or she navigates different and often unfamiliar environments. Because audio or even vibratory feedback may not always be heard or felt by a user, the embodiments described herein produce an additional dimension of communication with the user in the form of thermal feedback. In this manner, when the user is not able to hear audible prompts by the device, the user may still receive information to allow the user to efficiently navigate their environment.

As a non-limiting example, the vision-assist device may detect a point of interest relevant to a user and produce a thermal feedback that is applied to a body of the user to provide information about that point of interest. For example, the vision-assist device may supply information indicative of a direction in which the user should travel to reach the point of interest. As described in more detail below, the thermal feedback may also provide the user with information relevant to interacting with the vision-assist device itself. For instance, when the user wishes to interact with the vision-assist device, heating elements may signal to the user instructions on how to communicate the user's needs to the vision-assist device.

It is noted that a point of interest, as used herein, may describe a variety of locations. Some non-limiting examples include restrooms, addresses, shops, and restaurants. In some embodiments, the vision-assist device may direct a user to certain objects as well. Non-limiting examples include trashcans, tables, lamps, chairs, etc.

Various embodiments of vision-assist devices and methods of providing information to a user through thermal feedback are described in detail herein.

Figure 1:
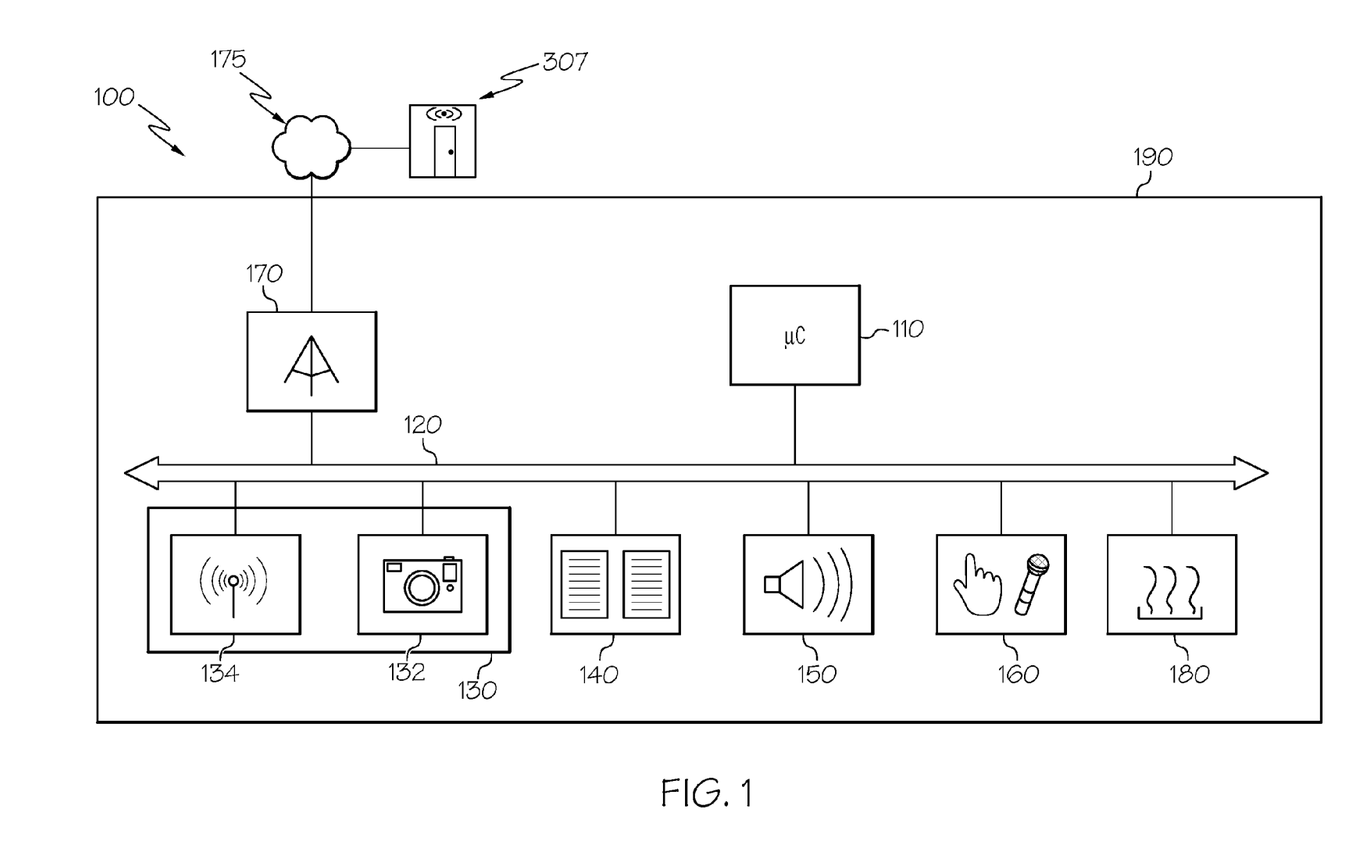
FIG. 1 schematically depicts a vision-assist device according to one or more embodiments described and illustrated herein.

Referring now to FIG. 1, an example, non-limiting vision-assist device 100 is schematically depicted. The vision-assist device 100 comprises a housing 190 in or on which components are disposed, such as one or more processors 110, one or more sensing devices 130, one or more memory modules 140 storing computer-readable instructions, one or more heating elements 180, and one or more user input devices 160. In some embodiments, one or more audio devices 150 are also provided. In yet further embodiments, the vision-assist device 100 may include network interface hardware 170 to send and receive information over a network 175. Though not shown, the vision-assist device 100 may also comprise a vibratory device to provide vibratory feedback to a user. As described in more detail below, the housing 190 may take on any configuration and, in some embodiments, may be configured to be worn by the user, thereby freeing the user's hands as he or she operates the vision-assist device 100.

Each of the one or more processors 110 may be any device capable of executing machine readable instructions. Accordingly, each of the one or more processors 110 may be a controller, an integrated circuit, a microchip, a computer, or any other computing device. The one or more processors 110 are coupled to a communication path 120 that provides signal interconnectivity between various components of the vision-assist device 100. Accordingly, the communication path 120 may communicatively couple any number of processors 110 with one another, and allow the modules coupled to the communication path 120 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 120 may be formed from any medium that is capable of transmitting a signal such as, for example, conductive wires, conductive traces, optical waveguides, or the like. In some embodiments, the communication path 120 may facilitate the transmission of wireless signals, such as WiFi, Bluetooth, and the like. Moreover, the communication path 120 may be formed from a combination of mediums capable of transmitting signals.

In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the one or more memory modules 140 are communicatively coupled to the one or more processors 110 over the communication path 120. The one or more memory modules 140 may comprise RAM, ROM, flash memories, hard drives, or any device capable of storing machine readable instructions such that the machine readable instructions can be accessed by the one or more processors 110. The machine readable instructions may comprise logic or algorithm(s) written in any programming language of any generation (e.g., 1GL, 2GL, 3GL, 4GL, or 5GL) such as, for example, machine language that may be directly executed by the one or more processors 110, or assembly language, object-oriented programming (OOP), scripting languages, microcode, etc., that may be compiled or assembled into machine readable instructions and stored on the one or more memory modules 140. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Additionally, the one or more memory modules 140 may be configured to store, among other things, operation logic, object recognition logic, and feedback generation logic to generate a thermal feedback signal, as described in more detail below. Any known or yet-to-be-developed object recognition algorithms may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like. It should be understood that the phrase "object recognition" as used herein also includes facial recognition algorithms used to detect people present within the image data.

In yet further embodiments, the one or more memory modules 140 may include a database that includes navigation information and/or map information. However, it should be understood that other embodiments may not include navigation information and/or map information.

Figure 7:
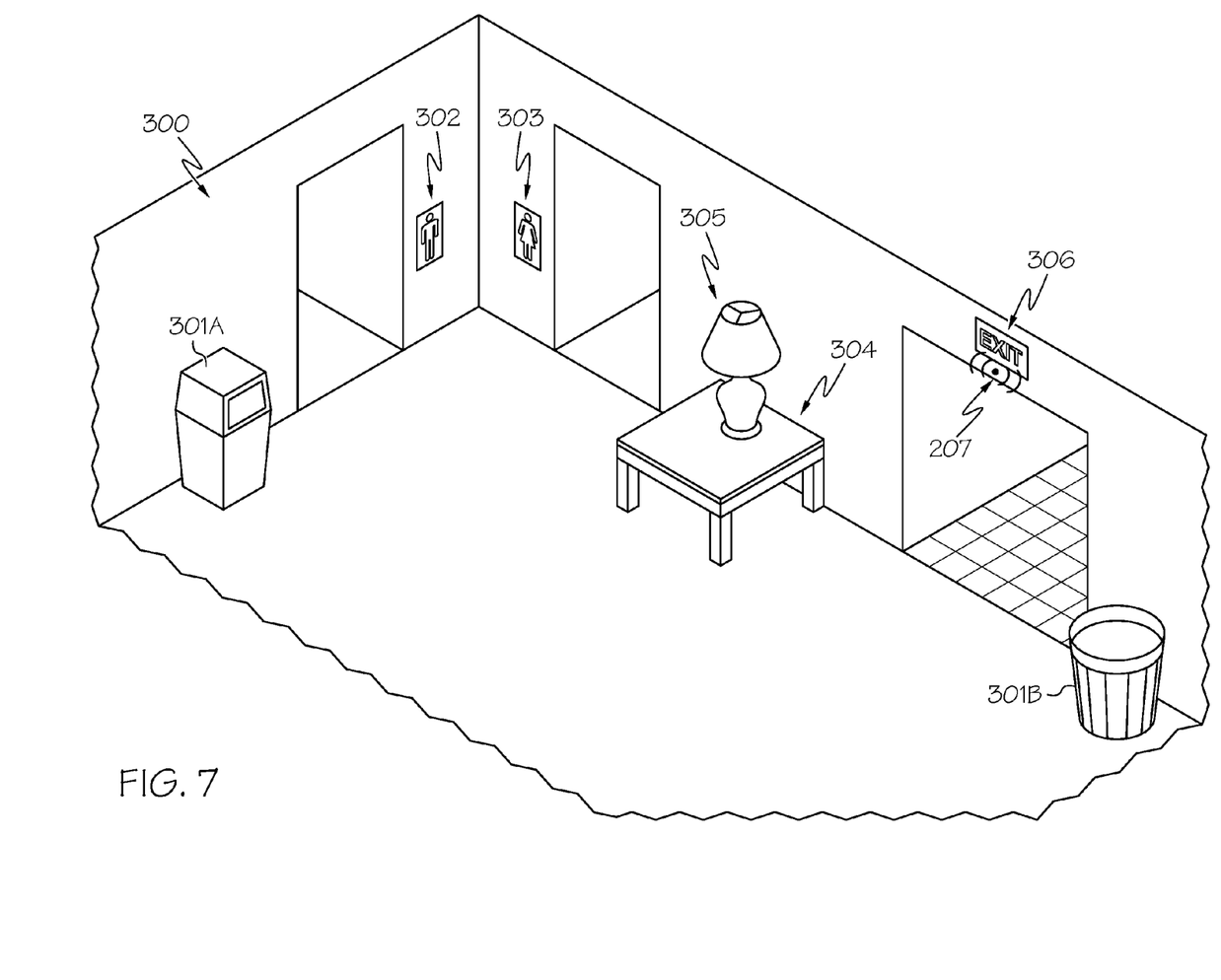
FIG. 7 schematically depicts an environment in which a user of the vision-assist device of FIG. 2 may navigate.

The one or more sensing devices 130 are communicatively coupled to the one or more processors 110 over the communication path 120. The one or more sensing devices 130 are operable to sense an environment in which the vision-assist device 100 operates. An example environment 300 is illustrated in FIG. 7. In general, the vision-assist device 100 senses characteristics of the environment including, but not limited to, objects, people, and points of interest.

As indicated, the one or more processors 110 may execute object recognition logic to classify the various objects, people, and points of interest sensed by the one or more sensing devices 130. The one or more processors 110 may then take a subset of the environmental information acquired by the one or more sensing devices 130 and produce a thermal feedback signal to relay the information to the user of the vision-assist device 100 to allow the user to navigate their environment. The subset of the environmental information may include, but is not limited to, information relating to a direction of a point of interest and information relating to instructions on maneuvering around an object or person.

As such, in at least one embodiment, the one or more sensing devises 130 include a camera 132 for capturing image data from the environment. The camera 132 may be any device having an array of sensing devices 130 (e.g., pixels) capable of detecting radiation in an ultraviolet wavelength band, a visible light wavelength band, or an infrared wavelength band. The camera 132 may have any resolution. In operation, the camera 132 captures image data to digitally represent the environment in which the vision-assist device 100 operates. The camera 132 may capture as image data information pertaining to the various objects, people and points of interest making up the environment. The one or more processors 110 may then execute object recognition logic to classify the different objects, people, and points of interest observed by the camera 132. For instance, the camera 132 may allow the vision-assist device 100 to recognize, through object recognition functionality, that a restroom is located nearby in the environment. In some embodiments two or more cameras 132 are provided to create stereo image data capable of capturing depth information.

In some embodiments, the one or more sensing devices 130 of the vision-assist device 100 include a proximity sensor 134 coupled to the communication path 120 such that the communication path 120 communicatively couples the proximity sensor 134 to other modules of the vision-assist device 100. The proximity sensor 134 may be any device capable of outputting a proximity signal indicative of a proximity of an object relative to the proximity sensor 134. In some embodiments, the proximity sensor 134 may include a laser scanner, a capacitive displacement sensor, a Doppler Effect sensor, an eddy-current sensor, an ultrasonic sensor, a magnetic sensor, an optical sensor, a radar sensor, a sonar sensor, or the like. Some embodiments may not include a proximity sensor 134. In some embodiments, the vision-assist device 100 may be configured to determine the presence of points of interest positioned within the environment 300 based on an output signal outputted by the proximity sensor 134.

The vision-assist device 100 further includes one or more heating elements 180. The one or more heating elements 180 are coupled to the communication path 120 such that the communication path 120 communicatively couples the one or more heating elements 180 to other modules of the vision-assist device 100. The one or more heating elements 180 are configured to produce thermal feedback in response to receipt of the thermal feedback signal from the one or more processors 110. Non-limiting examples of heating elements 180 include resistors, conductive plates, and heat fans. In some embodiments, the vision-assist device 100 may comprise combination of heating elements 180. Furthermore, the thermal feedback produced by the one or more heating elements 180 may be provided through a heat pattern or heat pulse applied to a body of a user. The thermal feedback may be indicative of at least one of a direction of a point of interest and instructions for communicating with the vision-assist device 100.

In embodiments of the vision-assist device 100 wherein the one or more heating elements 180 are conductive plates, the conductive plates may conduct heat away from one or more modules of the vision-assist device 100. For example, and not as a limitation, the one or more processors 110 may generate waste heat. Embodiments using one or more conductive plates may take advantage of the waste heat generated by the one or more processors 110 by conducting the heat from the one or more processors 110 to the conductive plate. For example, and not as a limitation, a conductive trace may thermally couple the conductive plate to the one or more processors 110. A conductive switch, controlled by the one or more processors may selectively couple and decouple the one or more processors to/from the conductive plates such that heat energy may flow or be prevented from flowing from the one or more processors to the conductive plates.

Figure 6:
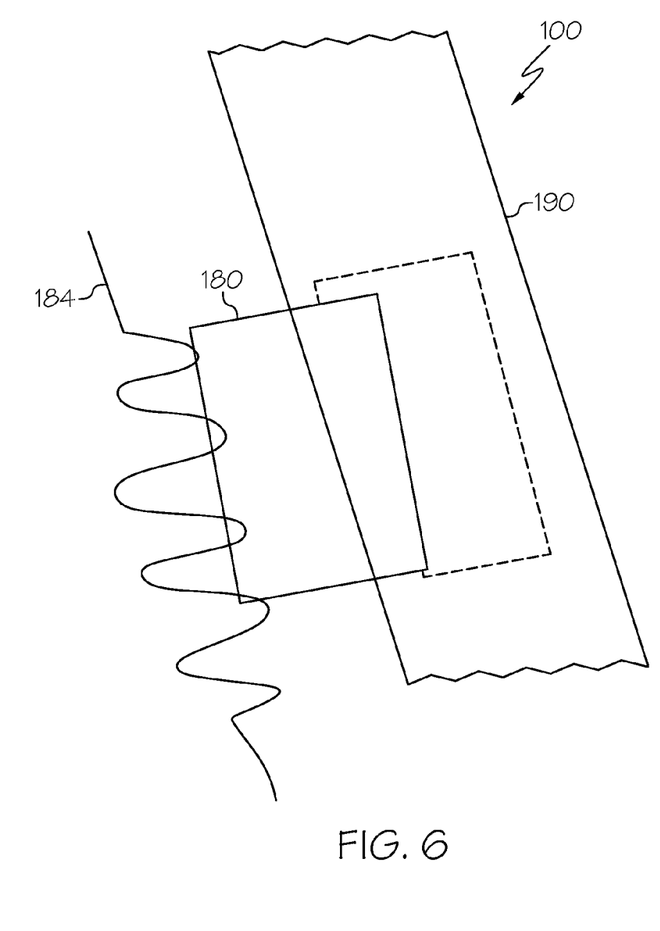
FIG. 6 schematically depicts an exploded view of a heating element of the vision-assist device of FIG. 2 according to one or more embodiments described and illustrated herein.

In embodiments of the vision-assist device 100 incorporating resistors, the resistors may be electrically coupled to the one or more processors 110, such that, based on a signal from the one or more processors 110, an electric current is passed through the resistor to generate thermal feedback. An electric switch may be selectively actuated by the one or more processors to allow an electric current to flow through the resistor. In embodiments incorporating heat fans, the heat fans may include a heated medium that includes conductive and/or resistive elements as described above. The one or more processors may selectively actuate the heat fans to cause air to be circulated over a heated medium thereby warming the air. The air may then be expelled from the heat fans to provide the user with thermal feedback. The one or more heating elements 180 may further include a cooling element 184, such as a water pipe, to remove heat from the one or more heating elements 180. In other embodiments there is no cooling element 184 (see FIG. 6).

Referring again to FIG. 1, in embodiments incorporating one or more auditory devices 150, the one or more auditory devices 150 may be configured as speakers capable of receiving auditory signals from the processor 110 (either directly or indirectly from other hardware, such as amplifiers, drivers, digital-to-analog converts, and the like) to produce auditory message capable of being heard by the user. In some embodiments, the one or more auditory devices 150 include a first speaker and a second speaker so that the auditory message is provided to the user in stereo.

The vision-assist device 100 also includes one or more user input devices 160. The one or more user input devices 160 are provided for the user to communicate with the vision-assist device 100. The one or more user input devices 160 may be used by the user to complete tasks such as program preferences or settings, provide commands, and provide feedback to the vision-assist device 100. The one or more user input devices 160 may take on any appropriate form. For example, the one or more user input devices 160 may be configured as a keyboard, buttons, switches, touch-sensitive pads, microphones, and the like. The one or more user input devices 160 may be used to allow the user to communicate with the vision-assist device 100. For example, and not as a limitation, the user may use the one or more user input devices 160 to communicate with the vision-assist device 100 a point of interest the user is interested in finding.

In some embodiments, the vision-assist device 100 may further include a network 175. In one embodiment, the network 175 is a personal area network that utilizes Bluetooth technology. In other embodiments, the network 175 may include one or more computer networks (e.g., a personal area network, a local area network, or a wide area network), cellular networks, satellite networks and/or a global positioning system and combinations thereof. Accordingly, the vision-assist device 100 can be communicatively coupled to the network 175 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, the vision-assist device 100 may, therefore, comprise network interface hardware 170. The network interface hardware 170 can be communicatively coupled to the communication path 120 and can be any device capable of transmitting and/or receiving data via a network. Accordingly, the network interface hardware 170 may include a communication transceiver for sending and/or receiving any wired or wireless communication. For example, the network interface hardware 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 170 includes hardware configured to operate in accordance with Bluetooth wireless communication protocol. In another embodiment, network interface hardware 170 may include a Bluetooth send/receive module for sending and receiving Bluetooth communications to and from the vision-assist device 100. In some embodiments, the network interface hardware 170 may be used to communicatively couple the components of the vision-assist device 100 to one or more points of interest. For example, in embodiments incorporating Bluetooth technology, one or more points of interest may have a Bluetooth beacon 207 (also shown in FIG. 7). The network interface hardware 170 may allow the vision-assist device 100 to communicate with the Bluetooth beacon 207 to navigate a user to the physical location of that point of interest. Some embodiments may not include network interface hardware 170.

It should be understood that the vision-assist device 100 may include additional components not illustrated in FIG. 1, such as a power source, voltage regulators, analog-to-digital converters, digital-to-analog converters, drivers, signal conditioning circuits, electromagnetic filtering circuits, and the like.

Figure 2:
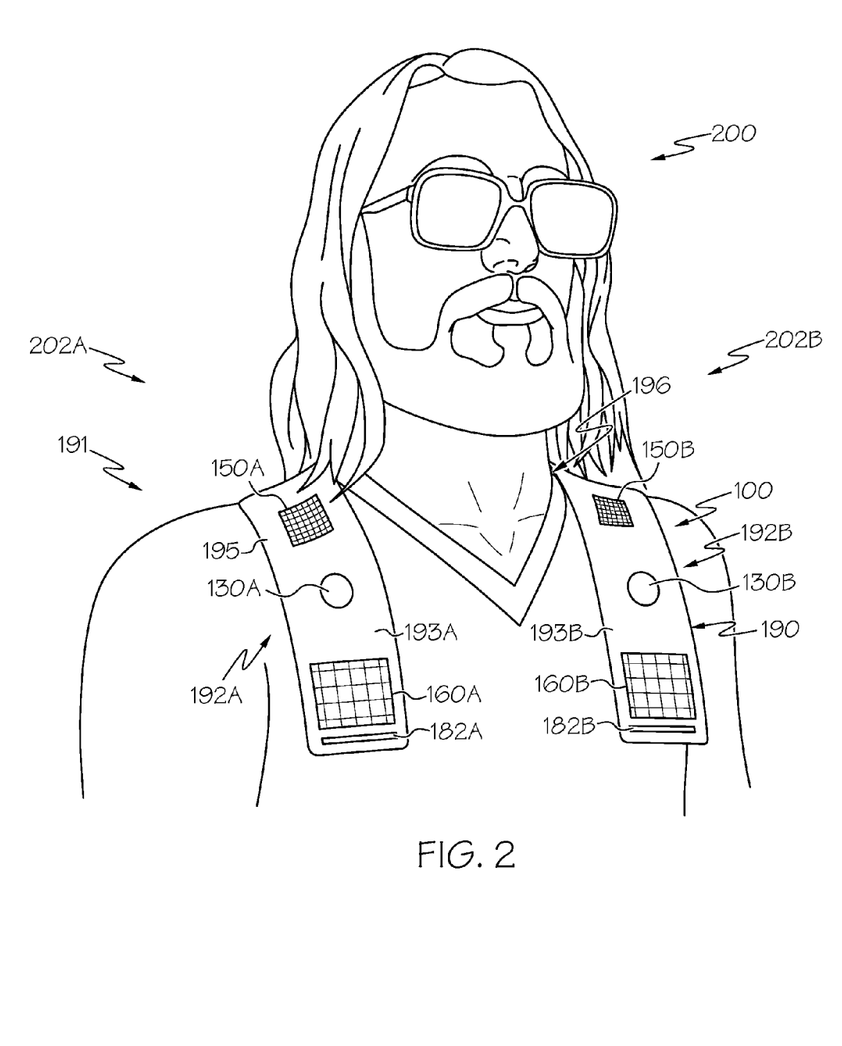
FIG. 2 schematically depicts a vision-assist device as worn by a user according to one or more embodiments described and illustrated herein.
Figure 3:
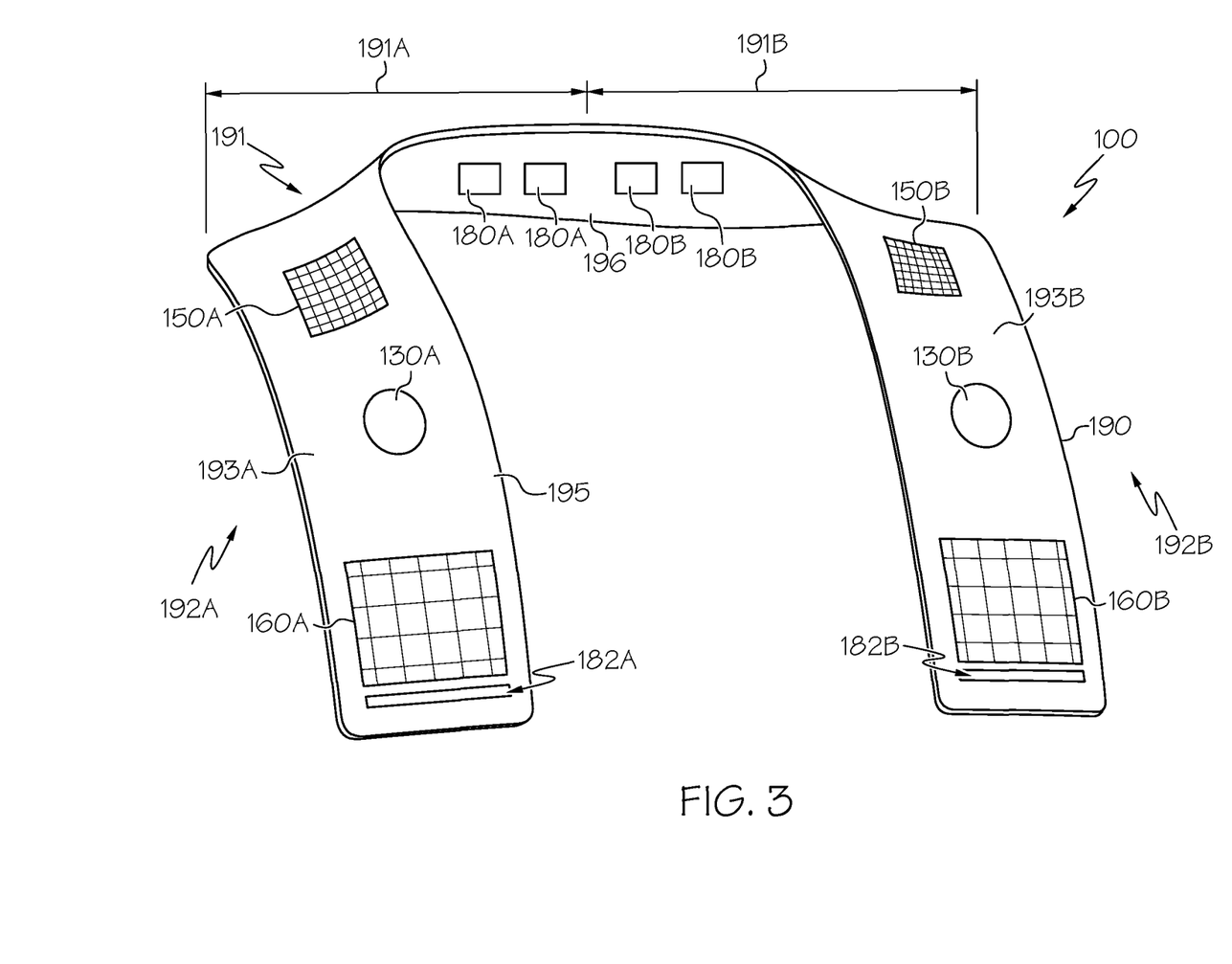
FIG. 3 schematically depicts the vision-assist device of FIG. 2 without the user according to one or more embodiments described and illustrated herein.

Referring now to FIGS. 2 and 3, a non-limiting, example vision-assist device 100 is schematically illustrated. FIG. 2 illustrates the example vision-assist device 100 worn by a user 200, while FIG. 3 illustrates the example vision-assist device 100 of FIG. 2 without a user. The housing 190 of the vision-assist device 100 generally comprises a first body portion 192A, a second body portion 192B, an environment facing surface 195, and a user facing surface 196 opposite the environment facing surface 195. When worn by a user 200, it is noted the first body portion 192A may be located on a first side 202A of the user 200 and the second body portion 192B may be located on the second side 202B of the user 200. It is noted that the housing 190 may have a variety of configurations and is not limited to the configurations shown in the figures.

The example vision-assist device 100, shown in FIGS. 2 and 3, has a necklace configuration intended to be worn around the neck of the user 200. The housing 190 of the vision-assist device 100 defines a neck portion 191, a first chest portion 193A, and a second chest portion 193B. The neck portion 191 generally defines a first neck portion 191A and a second neck portion 191B. However, as explained above the housing 190 may take on different shapes and sizes in other embodiments.

In some embodiments, the housing 190 is made from a pliable material, such as, without limitation, ethylene-vinyl acetate. In other embodiments, the housing 190 is made from a rigid material.

Referring specifically to FIG. 2, the example vision-assist device 100 is worn around the neck of the user 200 such that the user facing surface 196 of the neck portion 191 contacts, or is in close proximity to, the back of the user's neck. The first and second chest portions 193A, 193B are draped over the user's chest. In the illustrated example of FIGS. 2 and 3, the first chest portion 193A includes a first audio device 150A, a first sensing device 130A, a first chest heating element 182A, and a first user input device 160A configured as a touch-sensitive pad or a plurality of mechanical buttons disposed on the environment facing surface 195 of the housing 190. Similarly, the second chest portion 193B includes a second audio device 150B, a second sensing device 130B, a second chest heating element 182B, and a second user input device 160B disposed on the environment facing surface 195 of the housing 190. It should be understood that the arrangement of the various components within the housing 190 of the example vision-assist device 100 depicted in FIGS. 2 and 3 are for illustrative purposes only, and that more or fewer components may be provided, or arranged in a manner that is different from the arrangement depicted. As a non-limiting, alternative arrangement, there may be no heating elements coupled to the first and second chest portions 193A, 193B.

As described above, the first and second sensing devices 130A, 130B are configured to sense an environment of the user 200 by capturing image data and/or proximity data to produce three-dimensional images of the scene as the user 200 navigates the environment. The image and/or proximity data may be used by object recognition algorithm(s) to detect objects, people, and points of interest. As shown in FIG. 3, the first and second sensing devices 130A, 130B are disposed on the first and second chest portions 193A, 193B such that they are forward-facing and capture image and/or proximity data of the scene directly in front of the user 200. In other embodiments, one or more additional sensing devices 130 may be disposed within the housing 190 to provide image and/or proximity data in directions other than in front of the user 200, such as to the right, left and/or rear of the user 200.

In embodiments with audio devices 150, the first and second audio devices 150A, 150B produce auditory messages that are intended to be received by the user 200. The auditory messages may provide menu navigation options to the user 200 so that the user 200 may program or otherwise set parameters of the vision-assist device 100. Auditory messages also include a subset of environmental information about the environment, such as, but not limited to, directions to a point of interest, recognition of an upcoming obstacle, and time to reach a destination. Although two audio devices 150 are illustrated, more or fewer audio devices 150 may be provided. In some embodiments, a microphone is also provided as a user-input device to enable voice-control of the vision-assist device 100. In this manner, the user 200 may provide feedback to the vision-assist device 100 using voice commands. As an example and not a limitation, first and/or second audio device 150A, 150B may be configured as a combination speaker/microphone device capable of both receiving voice commands and emitting auditory messages/sounds.

Referring now to FIG. 3, the example, non-limiting vision-assist device 100 is shown to include one or more heating elements 180. The one or more heating elements may be one or more chest heating elements 182A, 182B disposed on the environment facing surface 195 and one or more neck heating elements 180A, 180B disposed on the user facing surface 196 of the vision-assist device 100. The one or more heating elements 180 are actuated by the one or more processors 110 (shown in FIG. 1) to cause the one or more heating elements 180 to emit thermal feedback to communicate information relating to a subset of environmental information acquired by the one or more sensing devices 130. It is noted that there may be many different configurations that the one or more heating elements 180 may take. For instance, though FIGS. 2 and 3 indicate that there may be one or more chest heating elements 182A, 182B on the environment facing surface 195 of the vision-assist device 100, in other embodiments there may be no chest heating elements 182A, 182B on the environment facing surface 195 of the vision-assist device 100.

Thermal feedback may be applied to a user 200 in a variety of ways. For instance, thermal feedback may be applied to a user 200 as a solitary heat pulse or as a heat pattern. Thermal feedback may be applied to the chest or neck of the user 200. In embodiments wherein one or more chest heating elements 182A, 182B are located on the environment facing surface 195 of the housing 190, the user 200 may use her hands to feel whether and in which direction thermal feedback is being emitted. However, as suggested above, in some embodiments, heating elements 180 may only be disposed on the user facing surface 196. It is noted herein that thermal feedback may be emitted in conjunction with audible and/or vibratory feedback to communicate with the user 200.

In some embodiments, and as shown in FIG. 3, the one or more heating elements 180 are located on the first and second neck portions. The one or more heating elements 180 may be at least a first heating element 180A located on the first neck portion 191A and a second heating element 180B located on the second neck portion 191B. However, it is contemplated that there may be a plurality of heating elements 180 on the first neck portion 191A and a plurality of heating elements 180 on the second neck portion 191B to allow for an expanded and varied set of heat patterns to be applied to a user 200.

Figure 4:
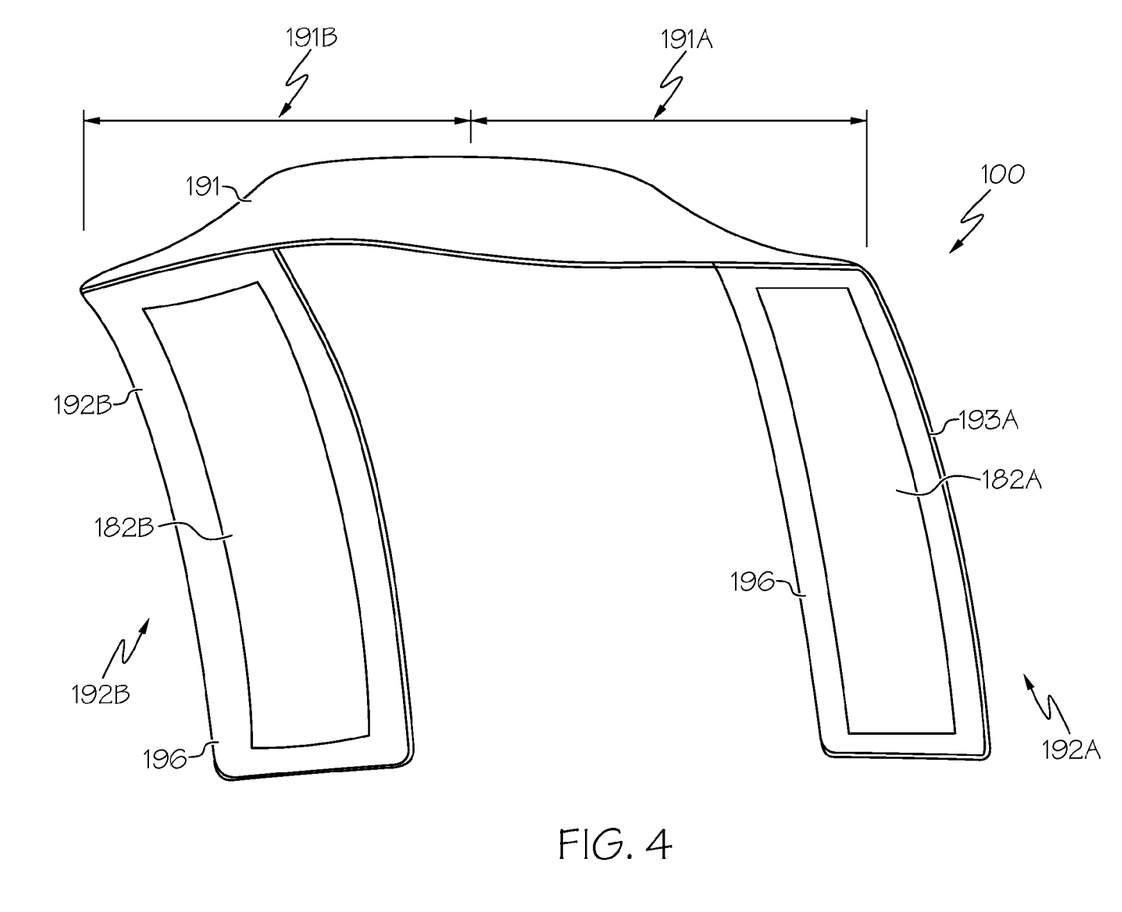
FIG. 4 schematically depicts an exemplary embodiment of a user facing surface of the vision-assist device of FIG. 2 according to one or more embodiments described and illustrated herein.
Figure 5:
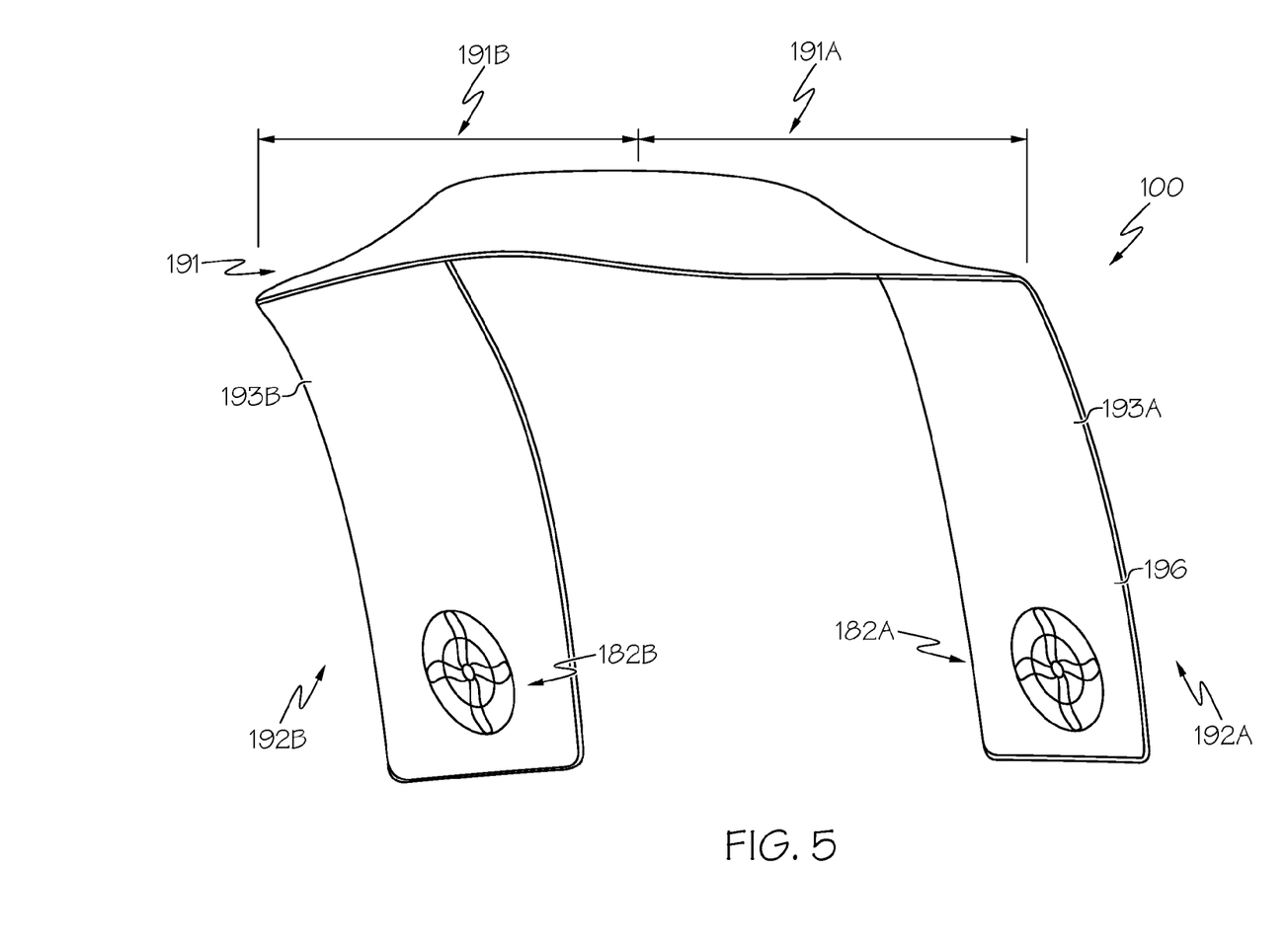
FIG. 5 schematically depicts another exemplary embodiment of a user facing surface of the vision-assist device of FIG. 2, according to one or more embodiments described and illustrated herein.

Referring now to FIGS. 4 and 5, it is contemplated that the user facing surface 196 of the first and second chest portions 193a, 193b may also include one or more chest heating elements 182A, 182B. As such, thermal feedback may therefore be applied to a first side of a user's chest and a second side of the user's chest (see FIG. 2). The one or more chest heating elements 182A, 182B could be any size or shape suitable to apply thermal feedback to a user 200.

FIG. 5 illustrates an example embodiment wherein the one or more chest heating elements 182A, 182B are implemented as heat fans. As described above, a heat fan may apply thermal feedback to a user 200 in the form of warm/hot air blown toward the body of the user 200. The heat may be generated by circulating air over a heated medium. The heated medium may be the result of conducting heat away from other modules of the vision-assist device that may generate waste heat in operation or from actively producing heat such as, for example, by passing an electric current through a resistor. As such, heat pulses or heat patterns may include the one or more processors 110 turning the heat fans on and off in a predetermined way to pass information on to the user 200. It is further noted that the use of a heat fan would not only give thermal feedback but also a percussive feedback due to the force the air would apply to the body when expelled by the heat fan.

As described above, FIG. 6 illustrates a means for cooling the one or more heating elements 180. As described above, the heating elements incorporating conductive plates or resistors may be selectively actuated by the one or more processors 110. The dissipation of heat after the one or more heating elements 180 have been selectively actuated, in these embodiments, may take an extended period of time. This time may create an unwelcome waiting period for the vision-assist device 100 to communicate through thermal feedback with the user after having delivered a first instance of thermal feedback. Therefore, in at least some embodiments, a cooling element, such as a water pipe, may conduct heat away from the one or more heating elements 180 to quickly and efficiently cool the one or more heating elements 180. Once the one or more heating elements 180 are effectively cooled, the vision-assist device 100 may continue to provide information to the user 200 by producing new thermal feedback patterns or pulses.

Operation of a vision-assist device 100 will now be described. FIG. 7 depicts a scene or environment 300 in which the user 200 may navigate. For example, the environment 300 may be a shopping mall. Several objects and features are present within the illustrated environment 300, such as a first trashcan 201A, a second trashcan 301B, a men's restroom as indicated by a men's restroom sign 202, a women's restroom as indicated by a women's restroom sign 203, a table 204, a lamp 205, and a store as indicated by a Store sign 206. As the user 200 navigates the environment 300, the vision-assist device 100 captures image data and detects objects within the environment 300. It is noted that any of the locations within the environment 300 described above, may be considered a point of interest of the user 200

As discussed herein, the one or more heating elements 180 of the vision-assist device 100 are configured to provide a variety of information to the user 200. Such information may include, but is not limited to, a subset of environmental information relating to a direction to a point of interest, or information relating to communicating with the vision-assist device 100 itself. This discussion will first focus on the navigational capacity of the vision-assist device 100.

Many times, a visually impaired or blind person will find themselves in an unfamiliar environment, such as shown in FIG. 7, and therefore may need to be provided with directions to locations within that environment 300. As such, the user 200, using the one or more user input devices 160 may communicate to the vision-assist device 100 where the user 200 would like to go. For instance, the user 200 may say, audibly and/or with user tactile input, "find me a women's restroom" or similar commands. The one or more processors 110 may then execute logic to find, with the one or more sensing devices 130, the location sought by the user 200. In this case, the one or more processors 110, through object recognition capabilities, would recognize the women's restroom sign 203. The one or more processors 110 may then execute logic to create a set of directions to the point of interest to be communicated with the user 200. In some embodiments, the vision-assist device 100 may be able to communicate turn-by-turn directions to a user 200 or may have more general directions as to the location of the point of interest. It is noted that the vision-assist device 100 may have a scanning mode, wherein the vision-assist device 100 automatically finds possible points of interest that the user 200 may then select from.

Once the one or more processors 110 have located the requested point of interest, in this case, a women's restroom, a thermal feedback signal is produced by the one or more processors 110. The thermal feedback signal is received by the one or more heating elements 180. Based on the thermal feedback signal, the one or more heating elements 180 produce thermal feedback to direct the user 200 to the point of interest. The user will feel the thermal feedback and process the information accordingly. Thus, depending on the location of the point of interest relative to the user 200, the one or more heating elements 180 will emit thermal feedback to indicate the direction the user 200 should travel to reach the point of interest. For example, referring also to FIGS. 2 and 3, if the point of interest is to the first side 202 of the user 200, the first heating element 180A and/or 182A on the first body portion 192A of the vision-assist device 100 will heat up. If, on the other hand, the point of interest is to the second side 204 of the user, the second heating element 180B and/or 182B on the second body portion 192B of the vision-assist device 100 will heat up. In some cases, if the point of interest is directly in front of the user 200, it is contemplated that both the first and second heating elements 180A and/or 182A, 180B and/or 182B will heat up, to indicate to the user 200 that the point of interest is directly ahead. In other embodiments, there may be a central heating element located in the center of the vision-assist device 100 to indicate that the point of interest is directly ahead. Any pattern of thermal feedback may be generated to correspond with any type of information or command.

As the user 200 moves toward the point of interest, the vision-assist device 100 may monitor the user's path for obstacles, e.g. people, tables, chairs, etc. The vision-assist device 100 upon sensing an obstacle may direct the user 200 around the obstacle using additional thermal feedback. For example, the vision-assist device 100 may selectively actuate the one or more heating elements 180 coupled to the first and second body portions of the housing 190. The selective actuation of the one or more heating elements 180 corresponds to the location of the obstacle relative to the vision-assist device and alerts the user to the presence and location of the obstacle.

Still referring to FIG. 7, various potential points of interest may have a Bluetooth beacon 207 that is capable of being sensed using the Bluetooth capabilities of the vision-assist device 100 as discussed herein. In the figure provided, a store represented by a store sign 206 has a Bluetooth beacon 207 beneath it. As such, the one or more processors 110 of the vision-assist device 100 may be able to pinpoint the position of the store relative to the vision-assist device 100 and provide directions to the store. In some cases, the user 200 of the vision-assist device 100 may not have to request a Bluetooth enabled location, it may be instead suggested by the one or more processors 110 of the vision-assist device 100 upon sensing the Bluetooth beacon 207. In such cases the vision-assist device 100 could emit audible feedback to the user 200, wherein the user 200 may then select whether or not to go to the location through the one or more user input devices 160.

As described herein, the one or more heating elements 180 may also provide information to the user 200 of the vision-assist device 100 relating to the use of the vision-assist device 100 itself. For example, the one or more heating may tell the user 200 when the vision assist device 100 is ready to listen to a command through the user 200 input device. As an example, and not a limitation, the user 200 may press on tactile input hardware indicating that the user 200 is ready to communicate with the vision-assist device 100. The vision-assist device 100 may then emit thermal feedback when it is ready to receive the user's command. In embodiments with heating elements 180 positioned on the outside facing surface of the user 200 assist device, the user 200 may feel with their hand whether or not thermal feedback is being emitted by the one or more heating elements 180. When thermal feedback is felt by the user 200, either using the hands or on the body of the user 200, the user 200 will know that the vision-assist device 100 is ready to hear the user's command. The user 200 may then input their command using the one or more user input devices 160. The vision-assist device may also communicate to the user other information relating to a status of the vision-assist device. Non-limiting examples include operating modes, battery levels, software updates, etc. As an example, and not a limitation, when the one or more processors 110 of the vision-assist device 100 detects a low battery, the one or more heating elements may emit a predetermined heat pulse or heat pattern to alert the user.

It should be understood that embodiments described herein provide for vision-assist devices and methods for providing information to blind or visually impaired users. The vision-assist devices and methods described herein allow for additional levels of communication with the user by providing thermal feedback to the body of the user. This thermal feedback may communicate navigational information to the user. In some embodiments, the thermal feedback may direct the user in communicating with the device itself. The thermal feedback as described herein may allow a user to understand information being delivered by the vision-assist device in situations where the user may not otherwise be able to hear the device.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vision-assist device comprising:
   one or more processors;
   one or more memory modules communicatively coupled to the one or more processors;
   one or more sensing devices communicatively coupled to the one or more processors and operable to sense an environment;
   one or more heating elements communicatively coupled to the one or more processors for producing thermal feedback;
   a housing configured to be worn on a body of a user comprising a first body portion and a second body portion, wherein the one or more heating elements comprise at least a first heating element coupled to the first body portion and a second heating element coupled to the second body portion; and machine readable instructions stored in the one or more memory modules that, when executed by the one or more processors, cause the one or more processors to:
  receive environmental information from the one or more sensing devices; and
  generate a thermal feedback signal regarding a subset of the environmental information acquired by the one or more sensing devices; and
  generate thermal feedback with the one or more heating elements in response to receipt of the thermal feedback signal, wherein the thermal feedback is indicative of the subset environmental information received from the one or more sensing devices.

2. The vision-assist device of claim 1, wherein the one or more heating elements are at least one of conductive plates, resistors, and heat fans.

3. The vision-assist device of claim 1, wherein heat generated by the one or more processors is conducted from the one or more processors to a conductive plate in response to the thermal feedback signal generated by the one or more processors.

4. The vision-assist device of claim 1, wherein:
the housing is configured to be worn around at least a neck of a user,
the first body portion of the housing comprises a first neck portion and the second body portion of the housing comprises a second neck portion; and
the first heating element is coupled to the first neck portion and the second heating element is coupled to the second neck portion.

5. The vision-assist device of claim 4, wherein:
the first heating element comprises a plurality of heating elements coupled to the first neck portion; and
the second heating element comprises a plurality of heating elements coupled to the second neck portion.

6. The vision-assist device of claim 4, the housing further comprising:
a user facing surface;
an environment facing surface opposite the user facing surface, wherein the one or more heating elements are coupled to the environment facing surface; and
first and second chest portions, wherein the one or more heating elements are located on the first and second chest portions.

7. The vision-assist device of claim 1, wherein the one or more sensing devices comprise at least one of a proximity sensor and a camera.

8. The vision-assist device of claim 1 further comprising a user input device, wherein the user input device is at least one of a microphone and tactile input hardware.

9. A vision-assist device for providing non-visual commands, the vision-assist device comprising:
one or more processors;
one or more memory modules communicatively coupled to the one or more processors;
one or more cameras communicatively coupled to the one or more processors and operable to generate image data corresponding to an environment of a user;
one or more heating elements communicatively coupled to the one or more processors for producing thermal feedback; and
machine readable instructions stored in the one or more memory modules that, when executed by the one or more processors, cause the one or more processors to:
  receive environmental information of the environment of the user from the one or more cameras;
  target a location of a point of interest within the environment of the user;
  generate a thermal feedback signal regarding a subset of the environmental information acquired by the one or more cameras; and
  generate thermal feedback with the one or more heating elements, wherein the thermal feedback is indicative of at least one of instructions for communicating with the vision-assist device and directions to a location of a point of interest within the environment of the user.

10. The vision-assist device of claim 9, wherein the one or more heating elements are coupled to a housing configured to be worn on a body of the user.

11. The vision-assist device of claim 10, wherein:
the housing comprises a first body portion and a second body portion; and
the one or more heating elements comprise a first heating element coupled to the first body portion and a second heating element coupled to the second body portion.

12. The vision-assist device of claim 10, wherein:
the housing is configured to be worn around a neck of a user;
the housing comprises a first neck portion and a second neck portion; and
the one or more heating elements comprise a first heating element coupled to the first neck portion and a second heating element coupled to the second neck portion.

13. The vision-assist device of claim 9, further comprising a housing, the housing comprising:
a user facing surface; and
an environment facing surface opposite the user facing surface, wherein the one or more heating elements are coupled to the user facing surface.

14. The vision-assist device of claim 9, further comprising a housing, wherein the housing comprises:
a user facing surface; and
and an environment facing surface opposite the user facing surface, wherein the one or more heating elements are coupled to the environment facing surface.

15. The vision-assist device of claim 9, wherein the one or more heating elements are at least one of conductive plates, resistors, and heat fans.

16. The vision-assist device of claim 9 further comprising:
one or more auditory devices operable to produce audible feedback; and
one or more vibratory devices operable to produce vibratory feedback.

17. The vision-assist device of claim 9 further comprising a cooling element to cool the one or more heating elements.

18. A method for providing thermal feedback to indicate information regarding a point of interest comprising:
sensing an environment with one or more sensors;
receiving environmental information from the one or more sensors;
targeting a point of interest within the environment of a user;
determining the location of the point of interest within the environment; and
providing directions to the location of the point interest within the environment by generating thermal feedback indicative of directions to the location of the point of interest within the environment.

19. The method of claim 18, further comprising:
monitoring a path to the point of interest for obstacles; and generating additional thermal feedback regarding a presence of an obstacle.

20. The method of claim 18, wherein the thermal feedback is generated by one or more heating elements comprising at least one of conductive plates, resistors, and heat fans.

* * * * *

UNITED STATES PATENT AND TRADEMARK OFFICE
CERTIFICATE OF CORRECTION

PATENT NO. : 9,754,510 B1
APPLICATION NO. : 15/059880
DATED : September 5, 2017
INVENTOR(S) : Nobuyuki Matsuno Page 1 of 1

It is certified that error appears in the above-identified patent and that said Letters Patent is hereby corrected as shown below:

In Column 14, Line 40 in Claim 14: before "an environment" remove --and--

Signed and Sealed this
Twenty-fourth Day of April, 2018

Andrei Iancu
*Director of the United States Patent and Trademark Office*